US009612367B2

(12) United States Patent
Nomura

(10) Patent No.: US 9,612,367 B2
(45) Date of Patent: Apr. 4, 2017

(54) METHOD OF PRODUCING OPTICAL DEVICE, OPTICAL DEVICE, OPTICAL SYSTEM, AND IMAGING DEVICE

(71) Applicant: Asahi Glass Company, Limited, Tokyo (JP)

(72) Inventor: Takuji Nomura, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 112 days.

(21) Appl. No.: 14/737,917

(22) Filed: Jun. 12, 2015

(65) Prior Publication Data

US 2015/0276995 A1    Oct. 1, 2015

Related U.S. Application Data

(63) Continuation of application No. PCT/JP2013/083791, filed on Dec. 17, 2013.

(30) Foreign Application Priority Data

Dec. 21, 2012    (JP) .................................. 2012-279101

(51) Int. Cl.
*G02B 13/00* (2006.01)
*G02B 5/00* (2006.01)
(Continued)

(52) U.S. Cl.
CPC ............ *G02B 5/003* (2013.01); *G01J 1/0488* (2013.01); *G02B 1/04* (2013.01); *G02B 13/001* (2013.01)

(58) Field of Classification Search
CPC ......... G02B 5/003; G02B 1/04; G01J 1/0488; H01J 11/14; H01J 2211/444
See application file for complete search history.

(56) References Cited

U.S. PATENT DOCUMENTS 7,215,479 B1    5/2007 Bakin
8,888,303 B2 *  11/2014 Kashiwagi ............ G02B 5/003
                                                       359/601

(Continued)

FOREIGN PATENT DOCUMENTS

CN    101416083 A    4/2009
JP    52-076944 A    6/1977
(Continued)

OTHER PUBLICATIONS

International Search Report issued Apr. 1, 2014 in PCT/JP2013/083791, filed Dec. 17, 2013.

*Primary Examiner* — Tony Ko
(74) *Attorney, Agent, or Firm* — Oblon, McClelland, Maier & Neustadt, L.L.P.

(57) ABSTRACT

A method of producing an optical device, which includes a center region where a light absorbing part is substantially absent, a peripheral region, and an intermediate region between the center and peripheral regions, where the thickness of the light absorbing part gradually increases in a direction from the center region to the peripheral region, includes applying a resin material that absorbs light onto a transparent base material. A forming mold including a convex and a concave corresponding to the shape of the light absorbing part is pressed against the applied resin material. The light absorbing part is formed by curing the resin material through exposure to ultraviolet radiation with the forming mold being pressed against the resin material. A surface of the convex that faces the resin material when the forming mold is pressed against the resin material corresponds to the center region of the optical device and is flat.

19 Claims, 12 Drawing Sheets

(51) Int. Cl.
*G02B 1/04* (2006.01)
*G01J 1/04* (2006.01)

(56) References Cited

U.S. PATENT DOCUMENTS

| | | | |
|---|---|---|---|
| 9,431,632 B2 * | 8/2016 | Inoue | .................... G02B 5/045 |
| 2003/0016452 A1 | 1/2003 | Sayag | |
| 2005/0041949 A1 | 2/2005 | Onuki et al. | |
| 2007/0139792 A1 | 6/2007 | Sayag | |
| 2009/0052030 A1 | 2/2009 | Kaida et al. | |
| 2011/0242684 A1 | 10/2011 | Shinohara | |
| 2013/0129981 A1 * | 5/2013 | Hiromitsu | ........ B29D 11/00634 |
| | | | 428/158 |
| 2013/0329303 A1 | 12/2013 | Inomoto et al. | |

FOREIGN PATENT DOCUMENTS

| | | |
|---|---|---|
| JP | 6-317815 A | 11/1994 |
| JP | 11-231209 A | 8/1999 |
| JP | 2004-536341 A | 12/2004 |
| JP | 2009-521722 A | 6/2009 |
| JP | 2009-526268 A | 7/2009 |
| JP | 4428961 B2 | 12/2009 |
| JP | 2011-221120 A | 11/2011 |

\* cited by examiner

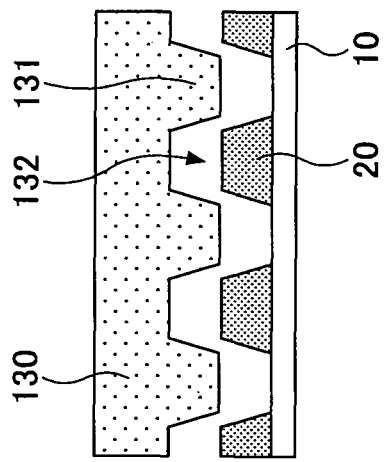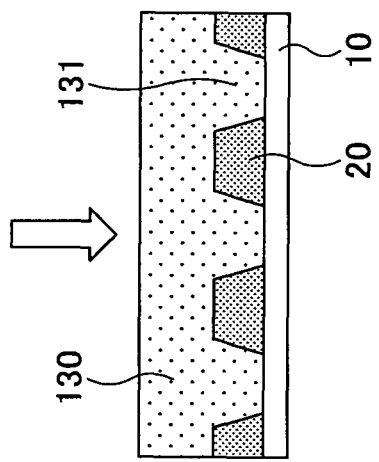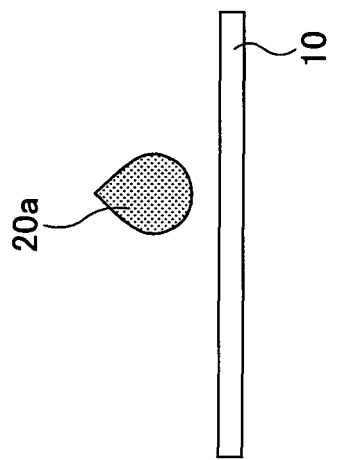

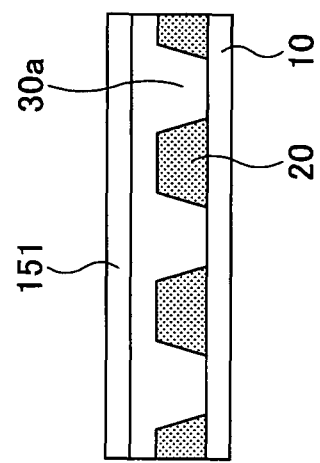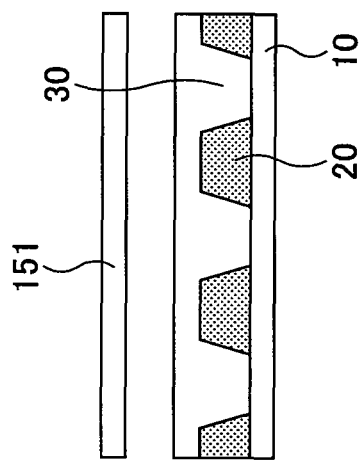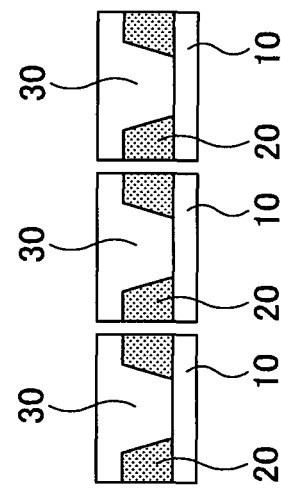

METHOD OF PRODUCING OPTICAL DEVICE, OPTICAL DEVICE, OPTICAL SYSTEM, AND IMAGING DEVICE

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2013/083791, filed on Dec. 17, 2013 and designating the U.S., which claims priority to Japanese Patent Application No. 2012-279101, filed on Dec. 21, 2012. The entire contents of the foregoing applications are incorporated herein by reference.

BACKGROUND OF THE INVENTION

1. Field of the Invention

The present invention relates to methods of producing an optical device, optical devices, optical systems, and imaging devices.

2. Description of the Related Art

In optical instruments such as cameras, an optical diaphragm and a neutral density (ND) filter are used in order to control the amount of light that enters a lens. Cellular phones and mobile terminals also are equipped with a camera, and such a camera uses an optical diaphragm (for example, Japanese Laid-Open Patent Application No. 11-231209). FIG. 1 illustrates a typical optical diaphragm. A diaphragm 910 is formed of a light blocking material to have a plate shape with an opening 911 being formed in the center. The diaphragm 910 blocks light except for the light passing through the center opening 911. In FIG. 1, the upper drawing is a plan view of the diaphragm 910, and the lower drawing illustrates a light transmittance distribution along one-dot chain line 1A-1B of the upper drawing. Recently, cellular phones and mobile terminals have been reduced in size and thickness, so that cameras as well have been reduced in size. Therefore, optical diaphragms used in cameras also have been reduced in size. When the diaphragm 910 is reduced in size, however, the diffraction of light occurs to a non-negligible extent around the opening 911, so that it is difficult to improve resolution. That is, while the number of pixels of cameras is increasing, there has been a demand for smaller optical diaphragms that do not lower resolution.

Reference may also be made to Japanese Laid-Open Patent Application No. 2011-221120 and Japanese Patent No. 4428961 for related art.

SUMMARY OF THE INVENTION

According to an aspect of the present invention, a method of producing an optical device that includes a light absorbing part and a light transmitting part formed on the light absorbing part and includes a center region, an intermediate region, and a peripheral region that are formed from a center toward a periphery of the optical device, wherein the light absorbing part is substantially absent in the center region, and a thickness of the light absorbing part gradually increases in a direction from the center region to the peripheral region in the intermediate region, includes applying a light absorbing resin material that absorbs a part or an entirety of light onto a transparent substrate; pressing a forming mold against the applied light absorbing resin material, the forming mold including a convex and a concave that correspond to a shape of the light absorbing part; forming the light absorbing part by curing the light absorbing resin material by exposing the light absorbing resin material to ultraviolet radiation with the forming mold being pressed against the light absorbing resin material; and removing the forming mold after the exposure to the ultraviolet radiation, wherein a surface of the convex that faces the light absorbing resin material when the forming mold is pressed against the light absorbing resin material corresponds to the center region of the optical device and is flat.

According to an aspect of the present invention, a method of producing an optical device that includes a light absorbing part and a light transmitting part formed on the light absorbing part and includes a center region, an intermediate region, and a peripheral region that are formed from a center toward a periphery of the optical device, wherein the light absorbing part is substantially absent in the center region, and a thickness of the light absorbing part gradually increases in a direction from the center region to the peripheral region in the intermediate region, includes applying a light absorbing resin material that absorbs a part or an entirety of light onto a forming mold that includes a convex and a concave that correspond to a shape of the light absorbing part; pressing a transparent substrate against the applied light absorbing resin material; forming the light absorbing part by curing the light absorbing resin material by exposing the light absorbing resin material to ultraviolet radiation with the transparent substrate being pressed against the light absorbing resin material; and removing the forming mold after the exposure to the ultraviolet radiation, wherein a surface of the convex that faces the light absorbing resin material when the forming mold is pressed against the light absorbing resin material corresponds to the center region of the optical device and is flat.

According to an aspect of the present invention, an optical device includes a light absorbing part made of a material that absorbs a part or an entirety of light and formed on a base material; and a light transmitting part made of a material that transmits the light and formed on the light absorbing part, wherein a center region, an intermediate region, and a peripheral region are concentrically formed from a center toward a periphery of the optical device, the light absorbing part is substantially absent in the center region, a thickness of the light absorbing part gradually increases in a direction from the center region to the peripheral region in the intermediate region, and $0.3<\phi 1/\phi 2<0.9$ is satisfied where $\phi 1$ is a diameter of a boundary between the center region and the intermediate region and $\phi 2$ is a diameter of a boundary between the intermediate region and the peripheral region.

According to an aspect of the present invention, an optical device includes a light absorbing part made of a material that absorbs a part or an entirety of light; and a light transmitting part made of a material that transmits the light and formed on the light absorbing part, wherein a center region, an intermediate region, and a peripheral region are concentrically formed from a center toward a periphery of the optical device, the light absorbing part is substantially absent in the center region, a thickness of the light absorbing part gradually increases in a direction from the center region to the peripheral region in the intermediate region, and a ratio of a lowest transmittance to a highest transmittance in the center region is 0.95 or more or the thickness of the light absorbing part is 0.2 μm or less at a point of the lowest transmittance in the center region.

According to an aspect of the present invention, an optical system includes any of the optical devices as set forth above; and a lens that the light transmitted through the optical device enters.

According to an aspect of the present invention, an imaging device includes any of the optical devices as set forth above; a lens that the light transmitted through the optical device enters; and an imaging element that the light exiting from the lens enters.

The object and advantages of the present invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIGS. 6A through 6F are diagrams illustrating a method of producing an optical device according to a second embodiment;

DETAILED DESCRIPTION OF THE PREFERRED EMBODIMENTS

Figure 2A:
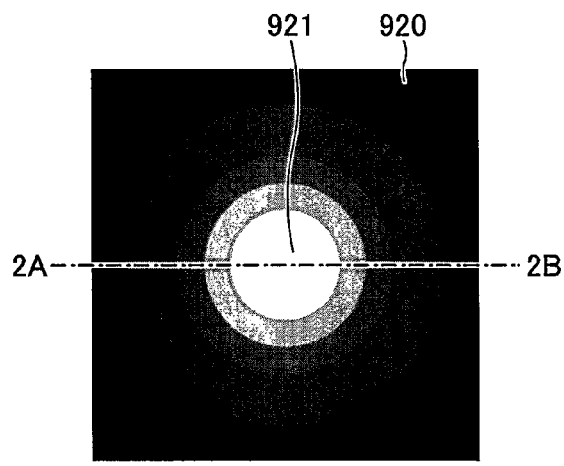
FIGS. 2A and 2B are diagrams illustrating an apodization filter.
Figure 2B:
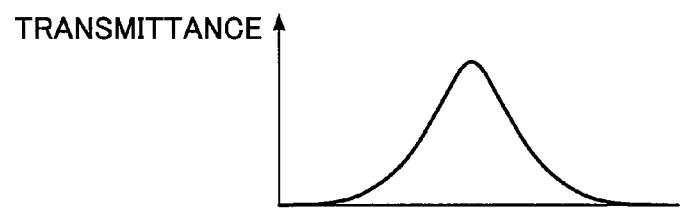

As an optical device that serves as the above-noted optical diaphragm, an apodization filter whose transmittance of light is high in the center and becomes lower toward the periphery from the center as illustrated in FIGS. 2A and 2B has been proposed. FIG. 2A is a plan view of a diaphragm 920 including an opening 921 in the center, and FIG. 2B illustrates a light transmittance distribution along one-dot chain line 2A-2B of FIG. 2A.

Such an apodization filter, which is designed so that the transmittance distribution is ideally a normal distribution, is difficult to produce because the center region that transmits light is small. Therefore, it has been difficult to produce uniform apodization filters without variations. Furthermore, there is a problem in that the optical system becomes dark because of a significant decrease in the substantial amount of transmitted light when the transmittance distribution is a normal distribution.

According to an aspect of the present invention, uniform optical devices in which the transmittance of light is high in the center and monotonously decreases from the center to the periphery are provided, and a method of producing such optical devices is provided.

A description is given below of embodiments of the present invention. In the following description, the same elements are referred to by the same reference numeral, and are not further described.

First Embodiment

A description is given of an optical device according to a first embodiment. The optical device according to this embodiment is a so-called "apodization filter." Referring to FIGS. 3, 4A and 4B, the optical device includes a transparent base material (substrate) 10 and a light absorbing part 20 and a light transmitting part 30 formed on the transparent base material 10. The transparent base material 10 is formed of a transparent resin material or glass. The light absorbing part 20 is formed of a material that absorbs visible light. The light transmitting part 30 is formed of a material that transmits visible light (a light transparent material). FIG. 4A is a plan view of the optical device according to this embodiment, and FIG. 4B illustrates a light transmittance distribution along one-dot chain line 4A-4B of FIG. 4A.

The optical device according to this embodiment includes a center region 21 at the center of the optical device, an intermediate region 22 formed around the center region 21, and a peripheral region 23 formed around the intermediate region 22.

The light absorbing part 20 is hardly formed in the center region 21, and is formed thick in the peripheral region 23. In the intermediate region 22 between the center region 21 and the peripheral region 23, the light absorbing part 20 is formed to gradually increase in thickness from the center region 21 to the peripheral region 23.

Here, letting the optical density of the light absorbing material of the light absorbing part 20 be OD and letting the thickness of the light absorbing part 20 be t, transmittance T (%) is expressed by:

$$T=100\times10^{(-OD \cdot t)}\% \quad (1)$$

Here, the optical density OD is expressed by:

$$OD=-\log(T0/100), \quad (2)$$

where T0 is transmittance (%) per unit thickness.

Thus, according to the optical device of this embodiment, the transmittance in the center region 21 is nearly 100% because the thickness of the light absorbing material is substantially zero in the center region 21, so that light entering the center region 21 is transmitted substantially in its entirety. Furthermore, the transmittance in the peripheral region 23 is determined by Eq. (1), and in the case of setting the transmittance to, for example, 0.1%, the optical density OD and the thickness t of the peripheral region 23 are determined so as to satisfy OD×t=3.

In the case of a light absorbing material having a high OD, that is, high absorption capability, it is possible to reduce thickness. If a film of the light absorbing material remains in the center region 21, however, the transmittance significantly decreases because of the remaining film, thus making it difficult to produce the optical device. On the other hand, reducing the OD increases the thickness of the peripheral region 23, thus not being suitable for an imaging system that seeks for reduction in thickness.

Accordingly, the thickness of the peripheral region 23, that is, the difference in height between the center region 21 and the peripheral region 23 of the light absorbing part 20, is preferably approximately 5 µm to approximately 100 µm, and more preferably, approximately 10 µm to approximately 30 µm, in terms of thinner optical devices and stable production of optical devices. The transmittance in the intermediate region 22 gradually decreases in a direction from the center region 21 to the peripheral region 23. Therefore, the amount of light transmitted through the intermediate region 22 gradually decreases in the direction from the center region 21 to the peripheral region 23.

According to the optical device of this embodiment, the transmittance varies according to the thickness of a light absorbing material. Therefore, the optical device of this embodiment is likely to obtain a highly accurate transmittance distribution with good reproducibility by precisely controlling the thickness of the light absorbing material using, for example, a forming mold. As a comparative example, a similar transmittance distribution may be created using an inkjet recording apparatus as illustrated in FIG. 4 of Japanese Patent No. 4428961. According to this technique, because the thickness of an ink receiving layer is constant, a distribution of optical density OD according to a desired transmittance distribution is obtained by precisely controlling the amount of ejection of liquid droplets in accordance with locations by the inkjet recording apparatus. According to this technique, while it is possible to reduce the thickness of the optical device with a thin ink receiving layer, there is the problem of difficulty in obtaining a highly accurate transmittance distribution with good reproducibility because of the sensitivity to the size of ink droplets and variations in the amount of ejection.

According to this embodiment, the center region 21, the intermediate region 22, and the peripheral region 23 are concentrically formed. Letting the diameter of the boundary between the center region 21 and the intermediate region 22 be φ1 and letting the diameter of the boundary between the intermediate region 22 and the peripheral region 23 be φ2, the center region 21, the intermediate region 22, and the peripheral region 23 are formed to satisfy:

$$0.3 < \phi 1/\phi 2 < 0.7. \quad (3)$$

Figure 3:
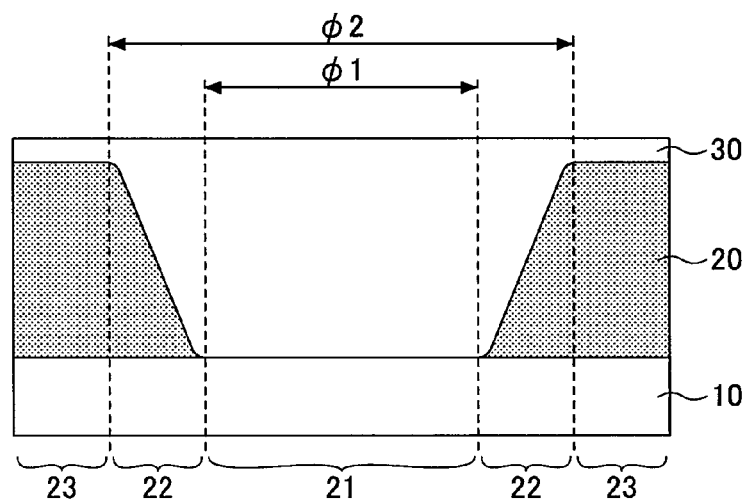
FIG. 3 is a structural diagram of an optical device according to a first embodiment.
Figure 4A:
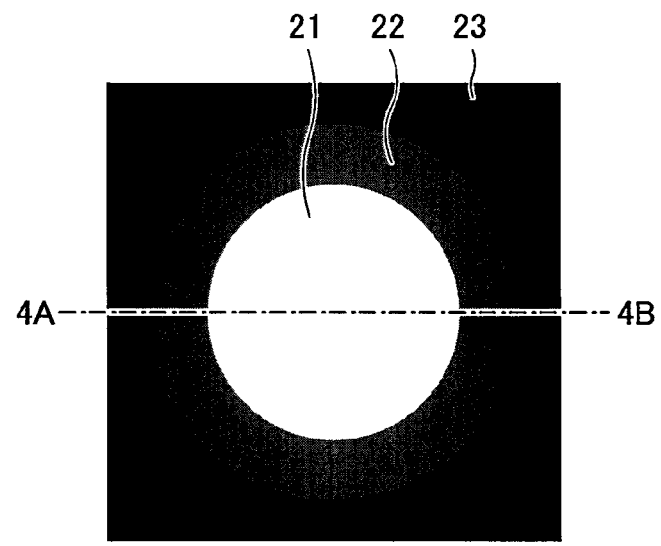
FIGS. 4A and 4B are diagrams illustrating the optical device according to the first embodiment.
Figure 4B:
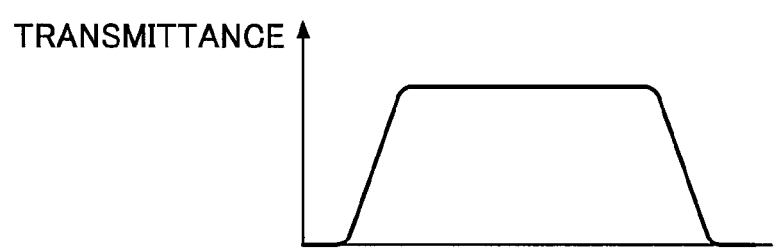

For example, in the optical device illustrated in FIG. 3, φ1 is 1.8 mm and φ2 is 3.0 mm, so that φ1/φ2=0.6, thus satisfying the above-noted expression (3).

Figure 1:
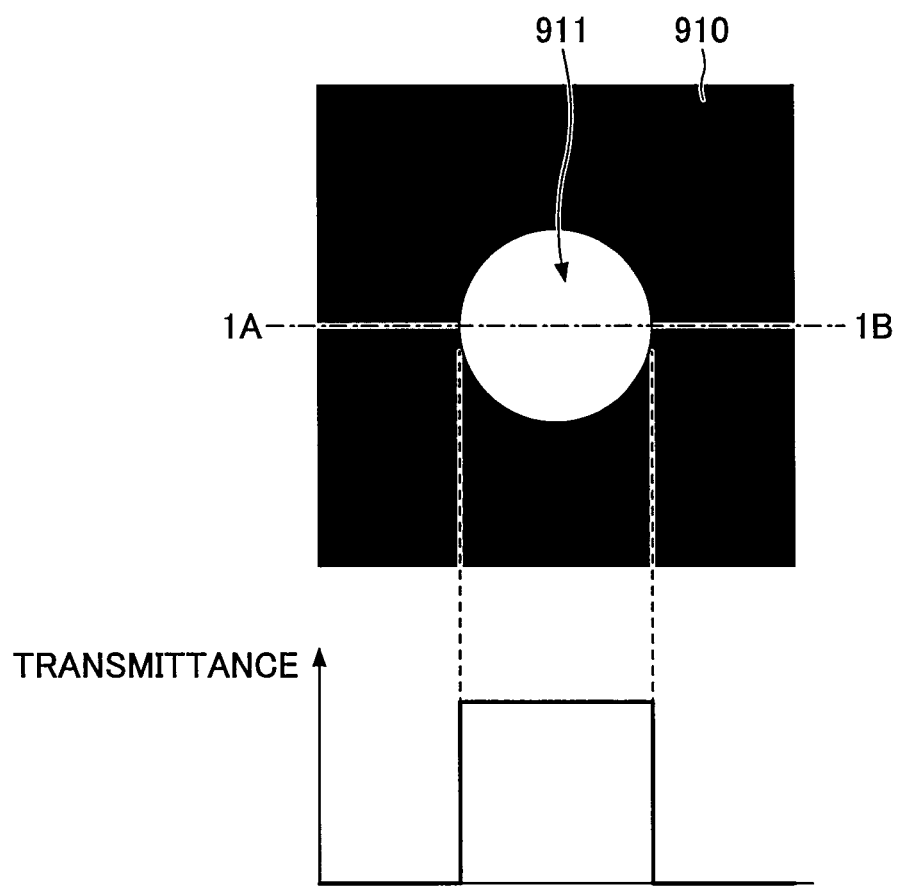
FIG. 1 is a diagram for illustrating a diaphragm.
Figure 5:
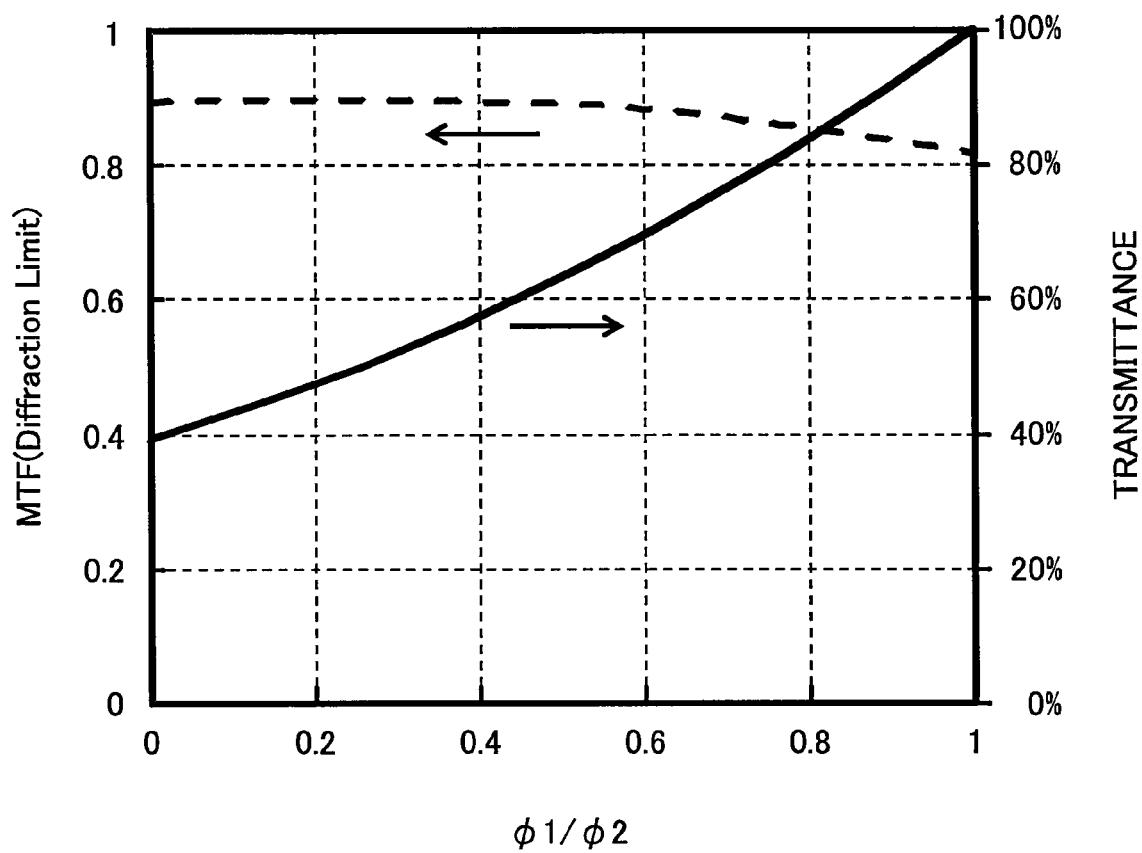
FIG. 5 is a graph illustrating a correlation between MTF and $\phi1/\phi2$ and a correlation between transmittance and $\phi1/\phi2$ in an optical device.

According to the optical device of this embodiment as described above, it is possible to increase the value of the modulation transfer function (MTF) at a predetermined spatial frequency. Therefore, it is possible to pick up an image of better quality when the optical device of this embodiment is applied to imaging devices such as a camera. The transmittance distribution of an ideal apodization filter that optimizes the MTF, however, is a normal distribution, so that a significant decrease in the amount of transmitted light due to an increase in the light blocking part of the filter may serve as a disadvantage. FIG. 5 illustrates changes in the MTF (indicated by a broken line) and transmittance (indicated by a solid line) according to the ratio of φ1 and φ2 described above. The transmittance is 100% when φ1/φ2 is 1, which corresponds to the typical aperture stop illustrated in FIG. 1. When φ1/φ2 is 0, which corresponds to an ideal apodization filter whose transmittance distribution is a normal distribution, the MTF is optimized while the transmittance is reduced by approximately 60%. According to this embodiment, the optical device is formed so that φ1/φ2 satisfies the expression (3). Therefore, it is possible to provide a bright optical device that picks up a larger amount of light than the ideal apodization filter with the degradation of the MTF from that of the ideal apodization filter being limited.

Furthermore, in order to provide a brighter optical device capable of capturing a larger amount of light than the optical device formed to satisfy the expression (3), the optical device is preferably formed to satisfy:

$$0.3 < \phi 1/\phi 2 < 0.9. \quad (4)$$

Based on FIG. 5, the transmittance is 80% or higher when φ1/φ2 is 0.74, and the transmittance is 90% or higher when φ1/φ2 is 0.9. Thus, the range of the expression (4) is suitable for use that requires a larger amount of light. Even when φ1/φ2 is 0.7 to 0.9, the MTF is better than when φ1/φ2 is 1.0, which corresponds to the typical binary diaphragm, so that it is possible to pick up an image of better quality.

The light transmitting part 30 is formed so as to fill in a space where the light absorbing part 20 is not formed, and the light transmitting part 30 has a substantially flat surface. Therefore, the light transmitting part 30 is thickest in the center region 21 and thinnest in the peripheral region 23, and is gradually reduced in thickness in the direction from the center region 21 to the peripheral region 23. According to this embodiment, the visible light means light having a wavelength of 420 nm or more and 780 nm or less.

The transparent base material 10 may be formed of any transparent material such as glass or a resin. In particular, for use that requires reduction in thickness, such as for cameras for cellular phones, the transparent base material 10 is preferably reduced in thickness, for example, 0.1 mm or less in thickness. Furthermore, while being a flat plate in the embodiment illustrated in FIG. 3, the transparent base material 10 may alternatively be a lens. In particular, in a low-profile camera module for smartphones, which is limited in space, it is preferable to form an optical device on part of a lens that is a component of the camera module.

According to the optical device of this embodiment, the light absorbing part 20 is formed of a light-transmitting transparent resin material to which an absorbing material that absorbs light is added. A below-described light absorbing resin material 20a in liquid form that is used to form the light absorbing part 20 contains a transparent resin material to which an absorbing material is added.

Examples of absorbing materials include organic coloring matters (dyes and pigments) such as anthraquinone, phthalocyanine, benzimidazolone, quinacridone, azo-chelate, azo, isoindolinone, pyranthrone, indanthrone, anthrapyrimidine, dibromo anthanthrone, flavanthrone, perylene, perinone, quinophthalone, thioindigo and dioxazine dyes and/or pigments, aniline black, and nigrosine black; metal nanoparticles using gold, silver, copper, tin, nickel, palladium or any of their alloys; and inorganic pigments such as barium sulfate, zinc oxide, lead sulfate, yellow lead, red iron oxide, ultramarine, Prussian blue, chromium oxide, iron black, red lead, zinc sulfide, cadmium yellow, cadmium red, zinc, manganese violet, cobalt, magnetite, carbon black, carbon nanotubes, graphene, and titanium black. In particular, titanium black is preferable because of its good dispersibility and high absorption coefficient. Because it is possible to add titanium black at a low concentration to the below-described transparent resin material in forming the light absorbing part 20, it is possible to keep a low viscosity.

Titanium black is a compound of a low-order titanium oxide expressed by $TiN_xO_y$ ($0 \leq x < 1.5$ and $0.16 < y < 2$) or ($1.0 \leq x+y < 2.0$ and $2x < y$), and its particles are easy to obtain. In the case of use in optical devices, a lower haze is preferable. Therefore, the average particle size of titanium black particles used in this embodiment is preferably 100 nm or lower, and more preferably, 30 nm or lower. Here, the particle size of dispersed bodies means a number average particle size per one hundred particles in a transmission electron microscope (TEM) photograph, taken with a TEM, of a hundred thousand times magnified image of titanium black particles contained in an organic solvent.

According to this embodiment, a dispersant may be used in the case of using particles. The same is the case with titanium black. The dispersant is used to evenly disperse particles in resin. Examples of dispersants include polymeric dispersants (alkylammonium and its salts, alkylol ammonium salts of copolymers having an acid group, hydroxyl-containing carboxylic acid esters, copolymers containing a carboxylic acid, and copolymers containing an amide group), pigment derivatives, and silane coupling agents. Furthermore, a functional group or a polymerizable functional group that interacts with resin may be present in molecules of dispersants. Furthermore, the above-described dispersants may be used alone or in any combination.

The ratio of added titanium black to a transparent resin material is preferably 0.3 mass % or more and 15 mass % or less, and more preferably, 0.5 mass % or more and 13 mass % or less. This corresponds to an optical density of 0.2 or more and 4.0 or less at 10 μm. If the ratio of added titanium black is 0.3 mass % or less, a film thickness of 100 μm or more is necessary to achieve a desired transmittance, so that it may be difficult to form the light absorbing part 20. On the other hand, if the ratio of added titanium black is 15 mass % or more, reduction in transmittance per unit film thickness increases, so that a remaining film in the center part is required to be substantially zero, thus making it difficult to produce an optical device.

Furthermore, a material other than titanium black may also be added. In particular, carbon black monotonously decreases in transmittance toward 380 nm from 800 nm and thus exhibits a characteristic opposite to that of titanium black. Therefore, it is possible to make the transmittance less wavelength-dependent by combining titanium black and carbon black.

Examples of transparent resin materials include thermoplastic resins such as polyethylene terephthalate (PET), polyethylene naphthalate (PEN), polybutylene terephthalate (PBT), polycarbonate (PC)s, and cycloolefin polymer (COP)s; thermosetting resins such as polyimide (PI)s, polyetherimide (PEI)s, polyamide (PA)s, and polyamide-imide (PAI)s; and energy-ray curable resins such as acrylic and epoxy resins. In the case of using a thermosetting resin or an energy-ray curable resin, the absorbing material may be added when the resin is at the stage of a polymerization precursor compound (hereinafter also referred to as "polymerizable compound") such as an oligomer or monomer, and thereafter, curing may be performed. Among the above-described resins, the energy-ray curable resins are preferably used. Any component that cures through a polymerization reaction to become a cured material may be used as such a polymerizable compound without particular restrictions. For example, radical polymerization curable resins, cationic polymerization curable resins, and radical polymerization curable compounds (monomers) may be used without particular restrictions. Of these, the radical polymerization curable compounds (monomers) are preferable in light of the rate of polymerization and the below-described formability. Examples of radical polymerization curable compounds include resins that have a group having a carbon-carbon unsaturated double bond, such as a (meth)acryloyloxy group, a (meth)acryloylamino group, a (meth)acryloyl group, an aryloxy group, an aryl group, a vinyl group, and a vinyloxy group.

According to this embodiment, polymerizable compounds may be, but are not limited in particular to, monofunctional compounds such as ethoxylated o-phenylphenol acrylate, 2-(Perfluorohexyl)ethyl methacrylate, cyclohexyl (meth)acrylate, isobonyl(meth)acrylate, tricyclodecane (meth)acrylate, tricyclodecane methanol(meth)acrylate, tricyclodecane ethanol(meth)acrylate, 1-adamantyl acrylate, 1-adamantyl methanol acrylate, 1-adamantyl ethanol acrylate, 2-methyl-2-adamantyl acrylate, 2-ethyl-2-adamantyl acrylate, and 2-propyl-2-adamantyl acrylate; bifunctional compounds such as 9,9-bis[4-(2-acryloyloxy ethoxy)phenyl]fluorene, diethylene glycol di(meth)acrylate, 1,3-butanediol di(meth)acrylate, 1,4-butanediol di(meth)acrylate, neopentyl glycol di(meth)acrylate, isobonyl di(meth)acrylate, tricyclodecane di(meth)acrylate, tricyclodecane dimethanol di(meth)acrylate, tricyclodecane diethanol di(meth)acrylate, adamantane diacrylate, and adamantane dimethanol diacrylate; trifunctional compounds such as trimethylol propane tri(meth)acrylate; tetrafunctional compounds such as pentaerythritol tetra(meth)acrylate; and hexafunctional compounds such as di-pentaerythritol hexa(meth)acrylate. Furthermore, one or more kinds of polymerizable compounds may be included. In the case of using only a monofunctional compound, cohesive failure may occur at a release time after forming. Therefore, it is preferable to include a polyfunctional compound having two or more functional groups. In a combination of polymerizable compounds, a polyfunctional compound is preferably 1 mass % or more and 90 mass % or less, and more preferably, 10 mass % or more and 80 mass % or less. If the amount of a polyfunctional compound is less than 1 mass %, the cohesive failure improvement effect is insufficient. If the amount of a polyfunctional compound is more than 90 mass %, contraction after polymerization may become a major problem.

Furthermore, in addition to the above-described polymerizable compounds having a functional group having a carbon-carbon unsaturated double bond, polymerizable compounds having an epoxy group that initiates a ring-opening reaction may also be used. Although not illustrated in particular, in this case as well, using only a monofunctional compound may cause cohesive failure at a release time after forming, so that it is preferable to include a polyfunctional compound having two or more functional groups. In a combination of polymerizable compounds, a polyfunctional compound is preferably 1 mass % or more and 90 mass % or less, and more preferably, 10 mass % or more and 80 mass % or less. These photocurable resins may be used alone or in combination in order to reduce interface reflection by reducing a difference in refractive index from the base material and/or to control viscosity.

According to the optical device of this embodiment, the light transmitting part 30 is formed of the above-described transparent resin material. A below-described light-transmitting resin material 30a in liquid form that is used to form the light transmitting part 30 contains the above-described transparent resin material.

According to the optical device of this embodiment, an absorbing material that forms the light absorbing part 20 is substantially absent between the transparent base material 10 and the light transmitting part 30 in the center region 21, so that it is possible to increase and make uniform the transmittance in the center region 21.

Second Embodiment

Next, a description is given of a second embodiment. This embodiment is directed to a method of producing the optical device of the first embodiment. A description is given, with reference to FIGS. 6A through 6F, of a production method of this embodiment, according to which multiple optical devices according to the first embodiment are simultaneously produced.

Referring to FIG. 6A, first, an appropriate amount of the light absorbing resin material 20a for forming the light absorbing part 20 is dropped onto the transparent base material 10. The light absorbing resin material 20a is a liquid in which an absorbing material is added to a transparent resin material. The light absorbing resin material 20a used in this embodiment is cured through exposure to ultraviolet radiation.

Figure 7:
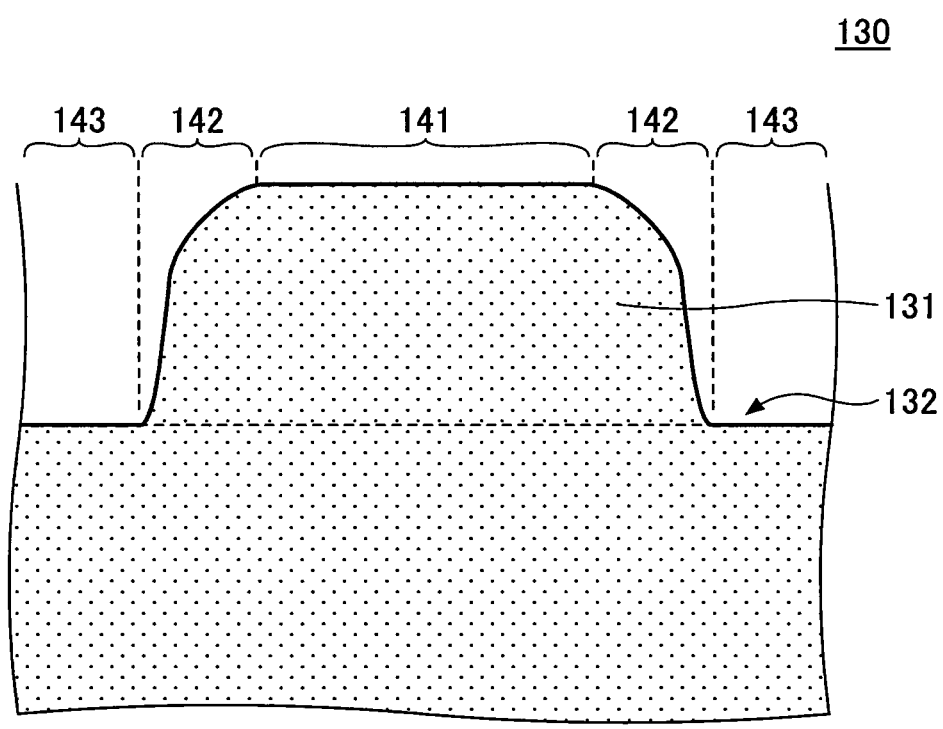
FIG. 7 is a diagram illustrating a forming mold used in the method of producing an optical device according to the second embodiment.

Next, referring to FIG. 6B, a forming mold 130 having an uneven surface on which irregularities corresponding to the shape of the light absorbing part 20 to be formed is faulted is pressed against the light absorbing resin material 20a with the uneven surface facing the light absorbing resin material 20a, and the light absorbing resin material 20a is exposed to ultraviolet radiation. As a result, the light absorbing resin material 20a is cured, so that the light absorbing part 20 is formed. FIG. 7 illustrates a surface shape of the forming mold 130 employed in this process. Referring to FIG. 7, a surface of the forming mold 130 includes a convex 131 and a concave 132, and the concave 132 forms the light absorbing part 20 of an optical device according to this embodiment. The forming mold 130 includes a center region 141 that serves as a top surface of the convex 131, a peripheral region 143 that serves as a bottom surface of the concave 132, and an intermediate region 142 between the top surface of the convex 131 and the bottom surface of the concave 132, that is, between the center region 141 and the peripheral region 143.

The forming mold 130 is formed so as to have a flat surface in each of the center region 141 that serves as the top surface of the convex 131 and the peripheral region 143 that serves as the bottom surface of the concave 132 and to be gradually reduced in height in a direction from the center region 141 to the peripheral region 143 in the intermediate region 142.

In the case of producing the apodization filter illustrated in FIGS. 2A and 2B in the same manner, the center region of a forming mold pressed against a light absorbing resin material is substantially point-shaped. In order to increase the transmittance in the center, it is necessary to remove the light absorbing resin material from the center region. Therefore, it is necessary to forcefully press the forming mold against the light absorbing resin material. As described above, however, the forming mold has a substantially pointed end. Therefore, the application of pressure may cause the forming mold to be buried into the transparent base substrate through the light absorbing resin material or to damage the transparent base substrate. Accordingly, it is necessary to control a pressing force with high accuracy. If a gap is formed between the end of the forming mold and the transparent base substrate and the light absorbing resin material remains in the gap, or if the end of the forming mold is buried into the transparent base substrate, an error is caused in the transmittance distribution illustrated in FIG. 2B. Such production variations in optical devices, which cause variations in the amount of captured light among imaging systems incorporating the optical devices, are not preferable.

On the other hand, according to this embodiment, the forming mold 130 has a flat surface in the center region 141 on the top surface of the convex 131. Therefore, even when the forming mold 130 is forcefully pressed against the light absorbing resin material 20a, the forming mold 130 is substantially prevented from being buried into the transparent base material 10 and is able to push out the light absorbing resin material 20a between the top surface of the convex 131 of the forming mold 130 and the transparent base material 10 because it is possible to press the light absorbing resin material 20a with an area of the diameter $\phi1$.

Therefore, it is possible to have substantially no light absorbing resin material 20a between the top surface of the convex 131 of the forming mold 130 and the transparent base material 10, and exposure to ultraviolet radiation is performed in this state. As a result, it is possible to stably produce optical devices in which the light absorbing part 20 including an absorbing material is not formed or is hardly formed in a part corresponding to the convex 131 of the forming mold 130, so that it is possible to constantly make the transmittance in this region high and uniform.

For example, $\phi1/\phi2=0.1$ and $\phi1/\phi2=0.3$ are compared with $\phi2$ being fixed, where $\phi1$ is the diameter of the boundary between the center region 21 and the intermediate region 22 and $\phi2$ is the diameter of the boundary between the intermediate region 22 and the peripheral region 23. In this case, the area of the center region 21 of $\phi1/\phi2=0.3$ is nine times the area of the center region 21 of $\phi1/\phi2=0.1$. Therefore, the pressure required by $\phi1/\phi2=0.3$ to push out the light absorbing resin material 20a between the top surface of the convex 131 of the forming mold 130 and the transparent base material 10 is nine times that required by $\phi1/\phi2=0.1$. When the effect sensitivity to an error from a desired pressure is considered, however, the pressure error is one-ninth per unit area. Therefore, it is possible to prevent the forming mold 130 from being buried into a resin base material such as a film by a pressure error.

Furthermore, in order to increase the transmittance, it is preferable to have no light absorbing resin material 20a remaining between the top surface of the convex 131 of the forming mold 130 and the transparent base material 10. It is possible, however, that the light absorbing resin material 20a is not completely removed by forcefully pressing the forming mold 130 against the light absorbing resin material 20a or that the top surface of the convex 131 of the forming mold 130 include minute and local irregularities or a slight concentric distribution of heights. In such a case, the light absorbing resin material 20a remains in part of the area of the center region 21. In this case, a variation in local transmittance values, that is, the ratio of the lowest transmittance to the highest transmittance in the center region 21, is preferably 0.95 or more because of a limited optical effect. From Eq. (1) and Eq. (2), letting the thickness of the light absorbing part 20 in the peripheral region 23 be 30 μm and letting the transmittance be 0.1%, that is, letting the OD value be 3, the variation in the film thickness of the light absorbing resin material 20a remaining in the center region 23 is preferably 0.2 μm or less because it is possible to make the variation in transmittance in the center region 21 5% or less.

Next, referring to FIG. 6C, the forming mold 130 is removed from the transparent base material 10. As a result, the light absorbing part 20 is formed on a surface of the transparent base material 10.

Next, referring to FIG. 6D, the light transmitting resin material 30a for forming the light transmitting part 30 is dropped onto the surface of the transparent base material 10 on which the light absorbing part 20 is formed, and the light transmitting resin material 30a is exposed to ultraviolet radiation through a transparent flat plate 151 placed on the dropped light transmitting resin material 30a. Because the light transmitting resin material 30a is curable through exposure to ultraviolet radiation, the light transmitting resin material 30a is cured through exposure to ultraviolet radiation to form the light transmitting part 30.

Next, referring to FIG. 6E, the transparent flat plate 151 is removed.

Next, referring to FIG. 6F, individual optical devices are separated by cutting. Specifically, individual optical devices are cut off from each other with a dicing saw or the like when the transparent base material 10 is glass or by blanking or the like when the transparent base material 10 is a film, so that a thick region of the light transmitting part 30 is in the center in each optical device.

By the above-described production method, it is possible to produce an optical device according to this embodiment. According to the optical device thus produced, the light absorbing part 20 containing an absorbing material that absorbs light is not formed or hardly formed in the center region 21 where the light transmitting part 30 is formed. Therefore, it is possible to make the transmittance in the center region 21 high and uniform.

Furthermore, according to this embodiment, a description is given of the case of dropping the light absorbing resin material 20a onto the transparent material 10, while it is also possible to produce the same optical device by dropping the light absorbing resin material 20a onto the forming mold 130.

Furthermore, anti-sticking treatment may be performed on a surface of the center region 141 that is the top surface of the convex 131 of the forming mold 130 illustrated in FIG. 7. For example, an anti-sticking agent may be applied on the surface of the center region 141 that is the top surface of the convex 131 of the forming mold 130. As a result, for example, the light absorbing resin material 20a supplied onto the center region 141 by application or the like is repelled, so that it is possible to produce an optical device in which the light absorbing part 20 is not formed in the center region 21 corresponding to the center region 141 that is the top surface of the convex 131 of the forming mold 130.

Furthermore, according to this embodiment, ultraviolet radiation is emitted from the forming mold 130 side. Therefore, the forming mold 130 may be formed of a material that is transparent to ultraviolet radiation, such as glass, quartz, or resin. Alternatively, in the case of emitting ultraviolet radiation from the transparent base material 10 side, the forming mold 130 may use a material that does not transmit ultraviolet radiation, such as nickel, copper, stainless steel, and stainless steel whose surface is plated with a metal that contains nickel. Furthermore, a resin to which a surface pattern is transferred from a glass mold formed of quartz or the like or a forming mold formed of one of the above-described metals may be used as the forming mold 130.

Third Embodiment

Next, a description is given of a third embodiment. This embodiment is directed to a method of producing the optical device of the first embodiment. A description is given, with reference to FIGS. 8A through 8G, of a production method of this embodiment, according to which multiple optical devices according to the first embodiment are simultaneously produced.

Figure 8A:
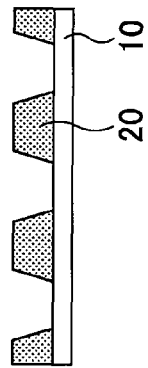
FIGS. 8A through 8G are diagrams illustrating a method of producing an optical device according to a third embodiment.

Referring to FIG. 8A, first, an appropriate amount of the light absorbing resin material 20a for forming the light absorbing part 20 is dropped onto the transparent base material 10. The light absorbing resin material 20a is a liquid in which an absorbing material is added to a transparent resin material. The light absorbing resin material 20a is cured through exposure to ultraviolet radiation.

Figure 8B:
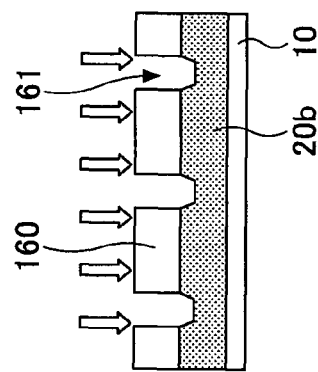

Next, referring to FIG. 8B, the light absorbing resin material 20a is exposed to ultraviolet radiation. As a result, light absorbing resin material 20a is cured, so that a light absorbing material part 20b is formed.

Figure 8C:
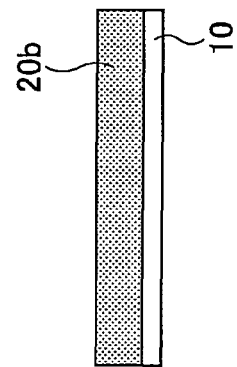

Next, referring to FIG. 8C, a mask 160 is formed on the cured light absorbing material part 20b, and etching is performed. The mask 160 includes openings 161 that correspond to regions where the light transmitting part 30 is to be formed. The mask 160 may be either a photomask or a metal mask. For example, in the case of a photomask, the mask 160 formed of a photomask including the openings 161 may be formed by applying a photoresist on the cured light absorbing material part 20b, exposing the photoresist to light using an exposure apparatus, and developing the photoresist. Examples of etching performed in this process include dry etching such as reactive ion etching (RIE).

Figure 8D:
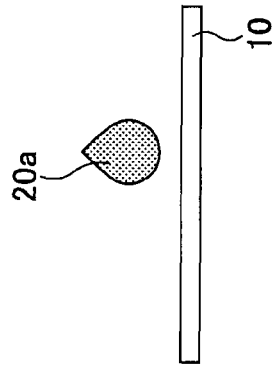

Next, referring to FIG. 8D, the cured light absorbing material part 20b at the openings 161 of the mask 160 is substantially completely removed by dry etching, and thereafter, the mask 160 is removed. As a result, the light absorbing part 20 is formed on the transparent base material 10.

In the case of producing the apodization filter illustrated in FIGS. 2A and 2B in the same manner, a region corresponding to the center region 21 of the optical device illustrated in FIG. 3, where the light absorbing material part 20b is to be completely removed, is point-shaped, so that the range of the intermediate region where the light absorbing material part 20b changes in film thickness increases accordingly. It is difficult to form such a shape by dry etching, and the amount of etching varies to change the film thickness and shape of the absorbing material in the center. Such production variations in optical devices, which cause variations in the amount of captured light among imaging systems incorporating the optical devices, are not preferable.

On the other hand, according to this embodiment, the region where the light absorbing material part 20b is to be completely removed as illustrated in the center region 21 of the optical device illustrated in FIG. 3 has an area of $\phi 1$. Therefore, the tolerance for etching variations increases, and the cured light absorbing material part 20b is substantially completely removed at the openings 161 of the mask 160. Therefore, it is possible to increase and make uniform the transmittance in the center region 21.

Figure 8E:
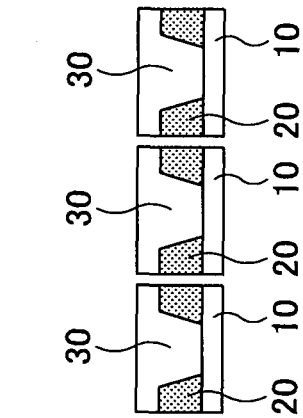

Next, referring to FIG. 8E, the light transmitting resin material 30a for forming the light transmitting part 30 is dropped onto the surface of the transparent base material 10 on which the light absorbing part 20 is formed, and the light transmitting resin material 30a is exposed to ultraviolet radiation through the transparent flat plate 151 placed on the dropped light transmitting resin material 30a. As a result, the light transmitting resin material 30a is cured to form the light transmitting part 30.

Figure 8F:
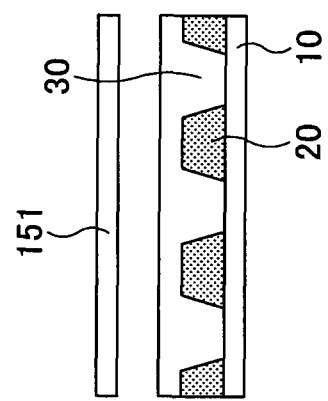

Next, referring to FIG. 8F, the transparent flat plate 151 is removed.

Figure 8G:
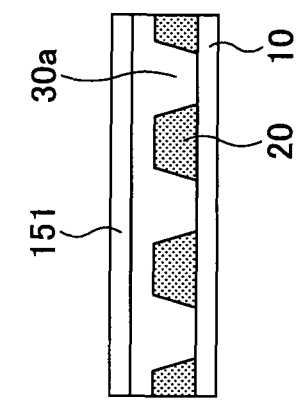

Next, referring to FIG. 8G, individual optical devices are separated by cutting. Specifically, individual optical devices are cut off from each other with a dicing saw or the like when the transparent base material 10 is glass or by blanking or the like when the transparent base material 10 is a film, so that a thick region of the light transmitting part 30 is in the center in each optical device.

By the above-described production method, it is possible to produce an optical device according to this embodiment. According to the optical device thus produced, the light absorbing part 20 containing an absorbing material that absorbs light is not formed or hardly formed in the center region 21 where the light transmitting part 30 is formed. Therefore, it is possible to make the transmittance in the center region 21 high and uniform.

Fourth Embodiment

Next, a description is given of a fourth embodiment. The forth embodiment is directed to an imaging device using one of the optical devices according to the first through third embodiments. Specifically, an imaging device according to this embodiment is mounted in mobile electronic devices having a communication function, such as smartphones and cellular phones.

Figure 9A:
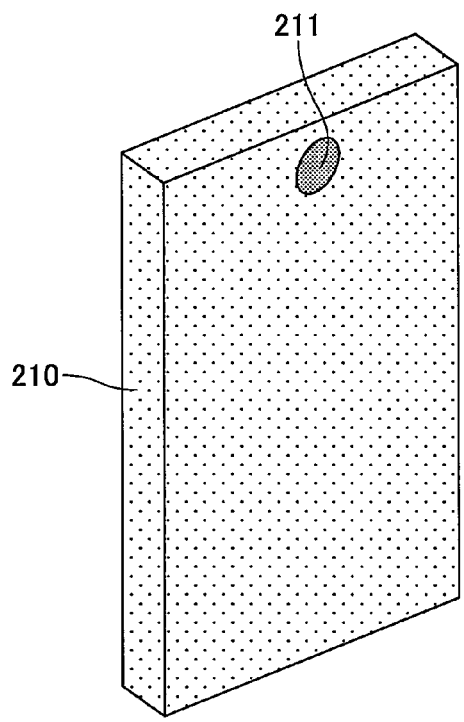
FIGS. 9A and 9B are diagrams illustrating a smartphone in which an imaging device is mounted according to a fourth embodiment.
Figure 9B:
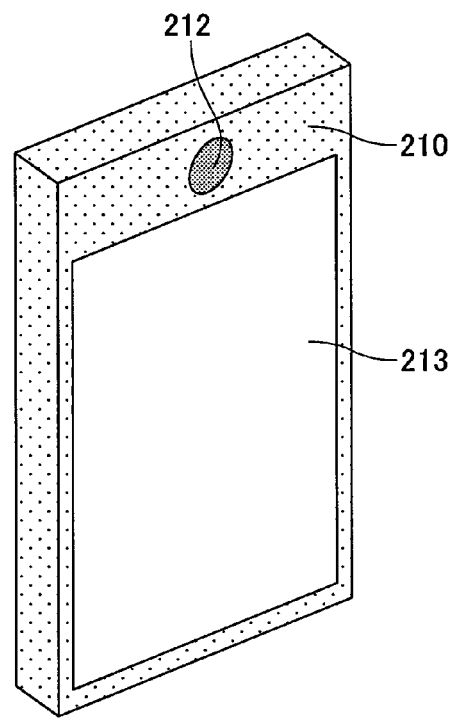

FIGS. 9A and 9B are a rear-side perspective view and a front-side perspective view, respectively, of a smartphone 210 according to this embodiment. Referring to FIGS. 9A and 9B, by way of example, an imaging device according to this embodiment is mounted as at least one of a primary camera 211 and a secondary camera 212 in the smartphone 210. The smartphone 210 includes first and second opposite surfaces, and includes the primary camera 211 provided on the first surface and the secondary camera 212 and a display screen 213 provided on the second surface.

Figure 10:
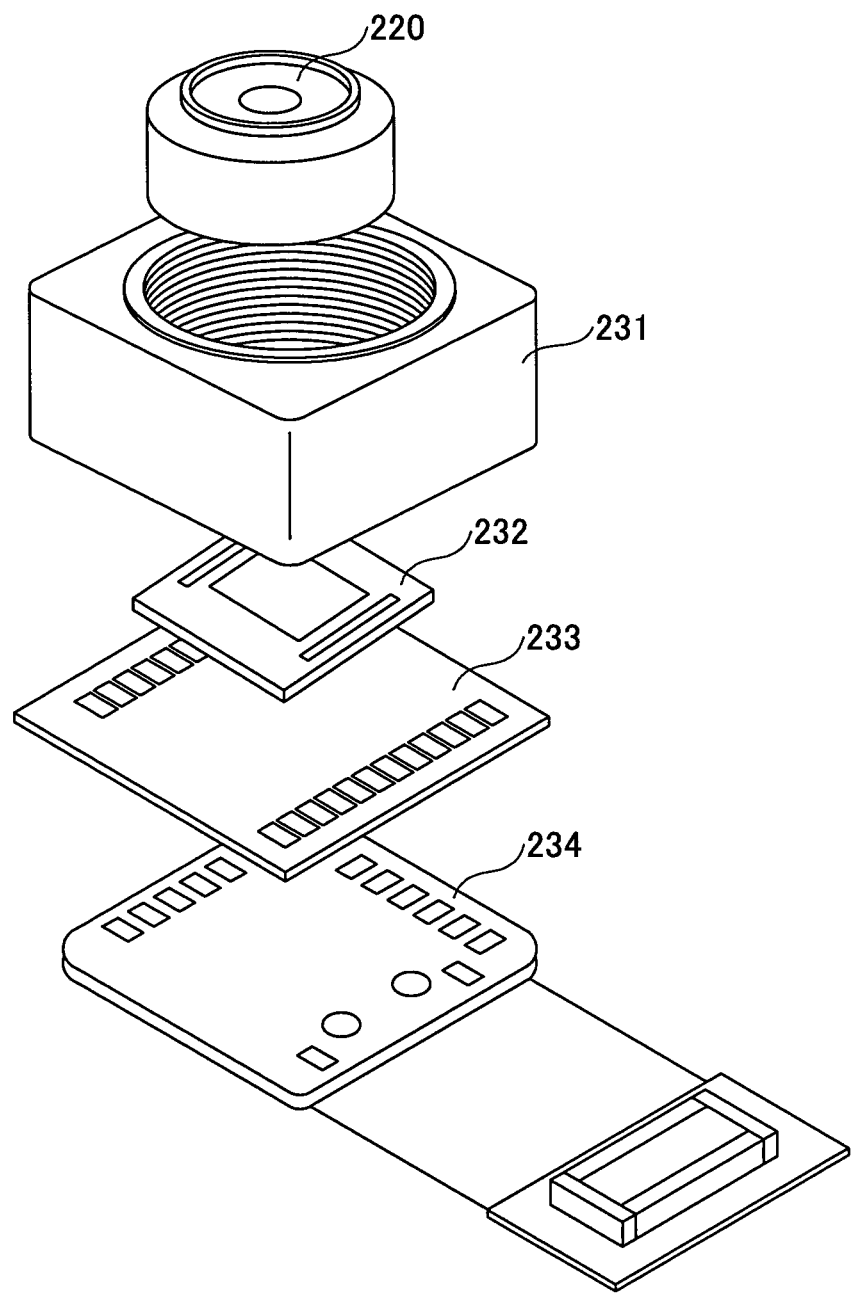
FIG. 10 is a diagram illustrating the imaging device according to the fourth embodiment.

FIG. 10 is an exploded perspective view of an imaging device according to this embodiment. Referring to FIG. 10, the primary camera 211 and/or the secondary camera 212, which is an imaging device according to this embodiment, includes an optical system 220, an autofocus unit 231, an image sensor 232, which is an imaging element, a substrate 233, and a flexible printed circuit (FPC) substrate 234. The optical system 220 is mounted in the autofocus unit 231. The autofocus unit 231 controls the movements of the optical system 220 to perform autofocusing. The image sensor 232 is formed of, for example, a CMOS sensor. The image sensor 232 detects an image due to light entering the image sensor 232 through the optical system 220.

Figure 11:
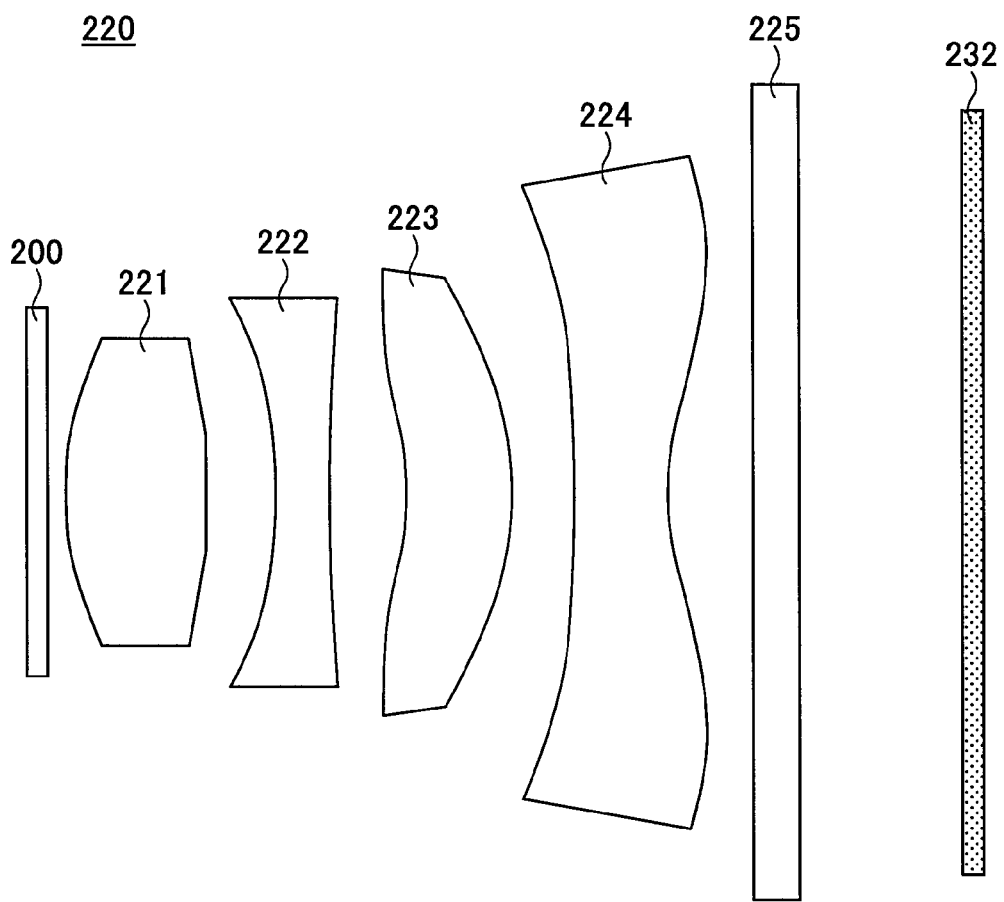
FIG. 11 is a diagram illustrating an optical system of the imaging device according to the fourth embodiment.

FIG. 11 is a diagram illustrating an optical system of an imaging device according to this embodiment. Referring to FIG. 11, the optical system 220 includes an optical device 200 according to the first embodiment, a first lens 221, a second lens 222, a third lens 223, a fourth lens 224, and an infrared cut-off filter 225.

According to this optical system 220, light entering through the optical device 200 enters the image sensor 232 through the first lens 221, the second lens 222, the third lens 223, the fourth lens 224, and the infrared cut-off filter 225.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Methods of producing an optical device, optical devices, an optical system, and an imaging device have been described in detail based on one or more embodiments of the present invention. It should be understood, however, that various changes, substitutions, and alterations could be made hereto without departing from the spirit and scope of the invention.

What is claimed is:

1. A method of producing an optical device that includes a light absorbing part and a light transmitting part formed on the light absorbing part and includes a center region, an intermediate region, and a peripheral region that are formed from a center toward a periphery of the optical device, wherein the light absorbing part is substantially absent in the center region, and a thickness of the light absorbing part gradually increases in a direction from the center region to the peripheral region in the intermediate region, the method comprising:

applying a light absorbing resin material that absorbs a part or an entirety of light onto a transparent substrate;

pressing a forming mold against the applied light absorbing resin material, the forming mold including a convex and a concave that correspond to a shape of the light absorbing part;

forming the light absorbing part by curing the light absorbing resin material by exposing the light absorbing resin material to ultraviolet radiation with the forming mold being pressed against the light absorbing resin material; and removing the forming mold after the exposure to the ultraviolet radiation, wherein a surface of the convex that faces the light absorbing resin material when the forming mold is pressed against the light absorbing resin material corresponds to the center region of the optical device and is flat.

2. The method as claimed in claim 1, wherein the forming mold is formed of a metal, glass or a resin, and an anti-sticking treatment is performed on the surface of the convex of the forming mold.

3. The method as claimed in claim 2, further comprising:

applying a light transmitting resin material that transmits the light onto a region of the transparent substrate corresponding to the center region of the optical device; and forming the light transmitting part by curing the applied light transmitting resin material by exposing the applied light transmitting resin material to ultraviolet radiation.

4. The method as claimed in claim 1, further comprising:

applying a light transmitting resin material that transmits the light onto a region of the transparent substrate corresponding to the center region of the optical device; and forming the light transmitting part by curing the applied light transmitting resin material by exposing the applied light transmitting resin material to ultraviolet radiation.

5. A method of producing an optical device that includes a light absorbing part and a light transmitting part formed on the light absorbing part and includes a center region, an intermediate region, and a peripheral region that are formed from a center toward a periphery of the optical device, wherein the light absorbing part is substantially absent in the center region, and a thickness of the light absorbing part gradually increases in a direction from the center region to the peripheral region in the intermediate region, the method comprising:

applying a light absorbing resin material that absorbs a part or an entirety of light onto a forming mold that includes a convex and a concave that correspond to a shape of the light absorbing part;

pressing a transparent substrate against the applied light absorbing resin material;

forming the light absorbing part by curing the light absorbing resin material by exposing the light absorbing resin material to ultraviolet radiation with the transparent substrate being pressed against the light absorbing resin material; and removing the forming mold after the exposure to the ultraviolet radiation, wherein a surface of the convex that faces the light absorbing resin material when the forming mold is pressed against the light absorbing resin material corresponds to the center region of the optical device and is flat.

6. The method as claimed in claim 5, wherein the forming mold is formed of a metal, glass or a resin, and an anti-sticking treatment is performed on the surface of the convex of the forming mold.

7. The method as claimed in claim 6, further comprising:

applying a light transmitting resin material that transmits the light onto a region of the transparent substrate corresponding to the center region of the optical device; and forming the light transmitting part by curing the applied light transmitting resin material by exposing the applied light transmitting resin material to ultraviolet radiation.

8. The method as claimed in claim 5, further comprising:

applying a light transmitting resin material that transmits the light onto a region of the transparent substrate corresponding to the center region of the optical device; and forming the light transmitting part by curing the applied light transmitting resin material by exposing the applied light transmitting resin material to ultraviolet radiation.

9. An optical device, comprising:

a light absorbing part made of a material that absorbs a part or an entirety of light and formed on a base material; and a light transmitting part made of a material that transmits the light and formed on the light absorbing part, wherein a center region, an intermediate region, and a peripheral region are concentrically formed from a center toward a periphery of the optical device, the light absorbing part is substantially absent in the center region, a thickness of the light absorbing part gradually increases in a direction from the center region to the peripheral region in the intermediate region, and $0.3<\phi1/\phi2<0.9$ is satisfied where $\phi1$ is a diameter of a boundary between the center region and the intermediate region and $\phi2$ is a diameter of a boundary between the intermediate region and the peripheral region.

10. The optical device as claimed in claim 9, wherein $0.3<\phi1/\phi2<0.7$ is satisfied.

11. The optical device as claimed in claim 10, wherein the base material is a lens or a transparent substrate formed of glass or a resin.

12. The optical device as claimed in claim 9, wherein the base material is a lens or a transparent substrate formed of glass or a resin.

13. An optical system, comprising:

the optical device as claimed in claim 9; and a lens that the light transmitted through the optical device enters.

14. An imaging device, comprising:

the optical device as claimed in claim 9;

a lens that the light transmitted through the optical device enters; and an imaging element that the light exiting from the lens enters.

15. The imaging device as claimed in claim 14, wherein the imaging device is configured to be mounted in a mobile electronic device having a communication function.

16. An optical device, comprising:

a light absorbing part made of a material that absorbs a part or an entirety of light; and a light transmitting part made of a material that transmits the light and formed on the light absorbing part, wherein a center region, an intermediate region, and a peripheral region are concentrically formed from a center toward a periphery of the optical device, the light absorbing part is substantially absent in the center region, a thickness of the light absorbing part gradually increases in a direction from the center region to the peripheral region in the intermediate region, and a ratio of a lowest transmittance to a highest transmittance in the center region is 0.95 or more or the thickness of the light absorbing part is 0.2 μm or less at a point of the lowest transmittance in the center region.

17. An optical system, comprising:

the optical device as claimed in claim 16; and a lens that the light transmitted through the optical device enters.

18. An imaging device, comprising:

the optical device as claimed in claim 16;

a lens that the light transmitted through the optical device enters; and an imaging element that the light exiting from the lens enters.

19. The imaging device as claimed in claim 18, wherein the imaging device is configured to be mounted in a mobile electronic device having a communication function.

* * * * *